United States Patent Office 3,462,502
Patented Aug. 19, 1969

3,462,502
PROCESS FOR PREPARING ALLYL CHLORIDE AND ITS MONOMETHYL-SUBSTITUTION PRODUCTS
Lothar Hörnig, Horst Grosspietsch, and Günter Mau, Frankfurt am Main, and Lothar Hirsch, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed July 12, 1966, Ser. No. 564,535
Claims priority, application Germany, July 23, 1965, F 46,702
Int. Cl. C07c 21/04
U.S. Cl. 260—654     4 Claims

ABSTRACT OF THE DISCLOSURE

An improved process has been provided for preparing allyl chloride or its monomethyl substitution products by reacting oxygen and (a) a mixture of hydrogen chloride and an olefin having 3 to 4 carbon atoms, respectively, (b) a monochloro paraffin having 3 or 4 carbon atoms, respectively, and (c) a mixture of (a) and (b) in the presence of a catalyst, said catalyst being selected from at least one member of the group consisting of tellurium and tellurium compounds and being supported on a carrier the amount of catalyst in said carrier system being from 0.5 to 20% by weight on basis of tellurium, the improvement of which comprises recycling said catalyst through a reaction zone at a temperature of from 20° to 350° C. and at a pressure from 0.2 to 20 atmospheres, removing a part of said catalyst at the bottom of the reaction zone and introducing it on the top of the reaction zone or fluidizing said catalyst by means of gas stream in the reaction zone by introducing said gas at the bottom of said reaction zone.

---

The present invention relates to a process for preparing allyl chloride and its monomethyl-substitution products.

It has already been proposed (cf. patent application Ser. No. 462,084) to prepare allyl chloride and its monomethyl-substitution products by passing oxygen and (a) mixtures of olefins with 3 or 4 carbon atoms and hydrogen chloride or (b) monochloroparaffins with 3 or 4 carbon atoms or (c) mixtures of (a) and (b) over catalysts containing elementary tellurium and/or tellurium compounds. The proposed process is especially suitable for the manufacture of allyl chloride and methallyl chloride. Still further, it has been proposed (cf. patent application Ser. No. 555,274) to improve the effectiveness of the catalyst by adding alkali metal compounds, especially compounds of potassium, rubidium and cesium, or basic nitrogen compounds, especially ammonia and amines and the salts thereof. The proposed catalysts are predominantly supported on carrier materials and the starting materials are reacted in their presence at a temperature in the range of from 100 to 350° C. At these high temperatures, however, tellurium compounds are volatile to a noticeable extent, particularly in the presence of hydrogen chloride. Therefore, the tellurium content of the catalysts diminishes, whereby they lose their effectiveness. Moreover, the entrained tellurium deposits in elementary or bound form in the colder parts of the apparatus and gives rise to mechanical troubles.

The present invention provides a process for preparing allyl chloride and its monomethyl-substitution products from oxygen and (a) mixtures of olefins with 3 or 4 carbon atoms and hydrogen chloride or (b) monochloroparaffins with 3 or 4 carbon atoms or (c) mixtures of olefins with 3 or 4 carbon atoms, hydrogen chloride and monochloro-paraffins with 3 or 4 carbon atoms, using catalysts supported on carriers and containing elementary tellurium and/or tellurium compounds, which comprises reacting the starting compounds while in the presence of continuously or discontinuously moved catalysts.

The operating temperatures are suitably within the range of from 20 to 350° C., more suitably 100 to 350° C. and the operating pressure ranges from 0.2 to 20 and preferably from 1 to 10 atmospheres.

The catalyst can be moved in parallel flow or in countercurrent flow with the streaming gas. It is expedient when the gas, after having left the reaction zone, passes a zone filled with the catalyst or containing the catalyst, in which zone a lower temperature prevails. The temperature in the said after-reaction zone is preferably below 200° C., more preferably below 150° C. The lower temperature limit is determined by the dew points of the starting compounds and the reaction products under the pressure conditions applied. Under the preferred working pressure of 0.2 to 20 atmospheres the dew points thus depend on the partial pressures of the gases, that is to say on their concentrations. Consequently, the temperature in the after-reaction zone should be above the dew point of the component having the highest boiling point.

In a simple mode of execution two vertical reactors are used which are arranged one above the other and which may be designed as shaft reactors or as a bundle of tubes. The fresh gases stream in at the bottom of the lower (hotter) reactor and the reaction gases leave at the head of the upper (colder) reactor. Both reactors are filled with the catalysts. The catalyst is discontinuously or continuously removed at the bottom of the lower reactor with the use of known lock systems, mechanically conveyed to the head of the upper reactor where it is again introduced. In this manner, the catalyst is conducted in a direction opposite to that of the gas current.

In anothed mode of execution of the process one shaft reactor filled with the catalyst is used. The upper part of the reactor is operated as (hotter) main reaction zone and the lower part is operated as (colder) after-reaction zone. The reactor contains a vertical tube, which is narrow with respect to the cross section of the reactor, advantageously arranged concentrically and open at either end. Into the lower end of the tube projects a little the still narrower gas inlet tube. Owing to the suction pressure the gas streaming in entrains the catalyst at the lower end of the inlet tube (gas lift) and conveys it to the head of the reactor. At the head the catalyst falls on the catalyst layer owing to the diminished velocity of flow, and the gas streams downwardly through the said layer. At the lower end of the reactor the gas leaves through several wide tubes. The recycled amount of catalyst depends, of course, on the particle size and the density of the catalyst and on the velocity of the gas in the lifting tube as well as on the dimensions of the apparatus. As compared with the first mode of execution, the latter one has the advantage that a lock system need not be used. But, on the other hand, it has the drawback that part of the fresh gas does not stream through the lifting tube but through the suction slit in the lower part of the reactor, without passing the reaction zone.

Besides the two modes of execution described above, different means may be used to move the catalyst in parallel or in counter-current flow with the gas current. For example, whirling layers can be used as reaction zones for the main reaction, in which case the catalyst particles discharged with the gas current are collected in separators with the catalyst, serving as after-reaction zone and suitably having a lower temperature than the reactor. From the separators the catalyst slides back into the reactor, for example through fall tubes.

It is also possible to include the after-reaction zone in the whirling layer by cooling the upper part of the reactor used.

When operating in this manner the catalyst "flows" in a continuous or discontinuous cycle through the reaction zone. It is expedient but not absolutely necessary to include in the cycle a colder after-reaction zone. In 24 hours the catalyst is advantageously circulated one to a hundred times. In general, a more rapid circulation does not offer any advantage.

The catalysts and carrier used in the present process are those mentioned in the aforesaid patent specifications. Suitable carrier materials are, for example, aluminum oxide, aluminum silicate, silicic acid, silica gel, pumice, zeolite or carbon.

Besides the carrier material, the catalysts contain elementary tellurium and/or one of several tellurium compounds.

The catalyst is advantageously prepared from elementary tellurium or tellurium compounds that are readily accessible in industry, for example tellurium-IV oxide, tellurium-IV chloride, tellurium-IV oxychloride, tellurium-IV sulfate, tellurium-II oxide, tellurium-II chloride, telluric acids, tellurites, tellurates, or tellurides. It is also possible to use organic tellurium compounds, for example mono- and di-alkyl and aryl tellurides, alkyl- and aryl-tellurium trichlorides, or dialkyl or aryl tellurium dichlorides.

In order to prepare a system consisting of catalyst and carrier material it is advantageous to fix a tellurium-containing solution, for example a solution of tellurium-IV chloride in hydrochloric acid, with one of the aforesaid carrier materials and to evaporate the mixture to dryness. A catalyst thus obtained, substantially containing the tellurium in bound form, can be directly used for the reaction. It is also possible, however, to reduce the tellurium compounds, for example with hydrogen, sulfur dioxide or another agent having a reducing action, to transform them into elementary tellurium.

The activity of the catalyst does not depend on whether elementary tellurium or a tellurium compound is used. Whether elementary tellurium or a tellurium compound is used, in most cases the catalyst contains, after some time of reaction, a mixture of elementary tellurium and bound tellurium. The presence of selenium in the catalyst does not have a detrimental effect on the reaction. It is advantageous to use a catalyst/carrier system containing 0.5 to 20% by weight of tellurium; but it is also possible to carry out the process with a catalyst containing a smaller or higher proportion of tellurium. The catalysts may additionally contain alkali metal compounds and/or basic nitrogen compounds or the salts thereof.

If alkali metal compounds are used in the preparation of the catalysts, alkali metal salts and from among these the salts of potassium, rubidium and cesium are preferred, but the oxides or hydroxides thereof may be used, too.

If basic nitrogen compounds are used in the preparation of the catalysts ammonia and organic amines and the salts thereof with inorganic and organic acids are especially suitable.

Suitable salts of basic nitrogen compounds are, for example, ammonium salts and ammonium salts carrying hydrocarbon substituents. The following salts are mentioned by way of example:

(a) Mono-, di-, tri-, and tetra-alkyl-ammonium salts having identical or different alkyl groups, such as methyl, dimethyl, trimethyl, tetramethyl, tri-isopropyl, methylethyl, stearyl, or methylbutyl-dodecyl ammonium salts;

(b) Aryl-ammonium salts such as anilinium salts and mono-, di-, and trialkyl-monoaryl-ammonium salts, such as N-methyl-, N,N-dimethyl-, and N,N,N-trimethyl-anilinium salts;

(c) Ammonium salts of aza-cycloaliphatic compounds such as pyrrolidinium salts and piperidinium salts and the N-mono- and N,N-dialkyl-derivatives thereof, as well as for example bis-1,5-pentamethylene-ammonium salts $[(CH_2)_5N(CH_2)_5]^+X^-$;

(d) The salts of aromatic nitrogen bases such as pyridinium, quinolinium, isoquinolinium salts and the alkyl derivatives thereof, for example N-methyl-pyridinium, or picolinium, lutidinium and collidinium salts.

Besides the monoammonium salts there may also be used the salts of polyvalent amines, for example:

(e) Alkylene-diammonium salts such as ethylene diammonium, hexamethylene diammonium or phenylene diammonium salts.

Still further, there can be used organic amines containing other elements, for example oxygen, in addition to C, H and N, such as mono-, di-, and tri-alkanol-amines and their salts.

The anionic components of the alkali metal salts or of the ammonium salts which may carry organic radicals as substituents preferably derive from acids of non-metals having the general formula $H_nX_mO_p$, in which $n$ represents the integer 1, 2, 3 or 4, $m$ represents 1, 2, 3 or 4, $p$ represents zero or an integer within the range of 1 to 8 and X represents F, Cl, Br, I, S, Se, N, P, C, for example the halides, selenides, sulfides, sulfites, sulfates, nitrates, phosphates or carbonates. When salts of polybasic acids are used they may be acid or neutral.

It is likewise possible to use salts of organic acids, for example of fatty acids having 1 to 5 carbon atoms.

In special cases the catalysts may be prepared from compounds containing tellurium as well as alkali metals or the ammonium group, for example alkali metal or ammonium tellurites, tellurates or hexachlorotellurates.

When an alkali metal compound is present in the catalyst it is advantageous, for example, to mix the carrier material with a solution of tellurium-IV chloride and potassium chloride in aqueous hydrochloric acid, an aqueous solution of cesium chloride and telluric acid or an alkaline solution of tellurium-IV oxide in aqueous rubidium hydroxide solution, and thereafter to dry or to evaporate to dryness the mixture obtained. It is also possible to apply the catalyst components to the carrier one after another. For example, initially the carrier may be impregnated with a solution of tellurium-IV chloride in hydrochloric acid, the mixture may be treated with sulfur dioxide to form elementary tellurium, and then an alkali metal salt, for example rubidium chloride may be applied. Alternatively, an alkali metal salt, for example cesium sulfate, may be applied initially to the carrier material and then a tellurium compound, for example telluric acid may be applied.

In many cases the composition of the freshly used catalyst mixture changes during the course of the reaction. For example, after a certain starting period the tellurium contained in the catalyst may partially be present in elementary form, while the alkali metal compounds or ammonium salts used are wholly or partially converted into the chlorides and/or free amines.

When alkali metal salts or ammonium salts are used it is expedient to use a catalyst/carrier system containing 0.1 to 30% and preferably 0.5 to 20% by weight of tellurium. The ratio of the alkali metal atoms or the ammonium nitrogen atoms in the catalyst to the free or bound tellurium atoms is advantageously within the range of 0.1:1 to 10:1.

When an ammonium salt is present in the catalyst, it is advantageous to mix the carrier with an acid or alkaline solution of a tellurium and an ammonium compound and to evaporate the mixture to dryness. For example, solutions of tellurium-IV chloride and dimethylammonium chloride in aqueous hydrochloric acid or aqueous solutions of telluric acid and anilinium sulfate or an ammoniacal solution of tellurium-IV oxide may be used. It is also possible to apply the catalyst components to the carrier one after another, for example initially the carrier may be impregnated with a solution of tellurium-IV chloride in hydrochloric acid, the mixture may be treated with sulfur dioxide to reduce the tellurium-IV compound, and then an aqueous ammonium salt solution may be applied, for example a solution of pyridinium chloride. Alternatively, an ammonium salt may be applied first, for example tetramethyl ammonium chloride and then a tellurium compound, for example in the form of aqueous orthotelluric acid, may be applied to the carrier.

The following examples serve to illustrate the invention but they are not intended to limit it thereto; the volume measurements of the gaseous components were taken under standard conditions, i.e. 0° C. and 760 millimeters of mercury.

EXAMPLE 1

Two vertical, jacketed glass tubes arranged one above the other, having a diameter of 35 millimeters and a length of 500 millimeters each were filled with a catalyst containing 4 grams of metallic tellurium for 100 milliliters of bentonite (in the form of balls having a diameter of 4 millimeters). At atomspheric pressure, 50 liters of propylene, 20 liters of oxygen and 30 liters of hydrogen chloride were introduced per hour at the bottom of the lower tube. After having left the upper tube, the reaction gas passed a condenser having a temperature of 20° C. in which the reaction water formed was obtained in the form of aqueous hydrochloric acid. The remaining gas was analysed.

In a first test, the temperature in the lower tube was 225° C. and in the upper tube 115° C. By means of a lock consisting of two glass cocks two times 50 milliliters of catalyst were discharged per hour from the lower tube and immediately introduced through an analogous lock into the upper tube. After having been in operation for 50 hours the external aspect of the catalyst was still unchanged. The aqueous hydrochloric acid condensate withdrawn from the condenser did not contain tellurium. In the cooling system and on the walls of the reaction tubes separations of tellurium could not be observed either. An analysis of the off-gas indicated a production of about 15 grams of allyl chloride per hour.

In a second test (comparative test) the upper tube was removed and the catalyst was not circulated. Under otherwise identical conditions a separation of tellurium metal was observed at the end of the reactor, in the connecting pipe to the condenser and in the condenser. The condensate contained not only tellurium metal but also a tellurium-IV compound. After having been in operation for 50 hours, 100 milliliters of the catalyst contained only 3.7 grams of tellurium instead of the initial 4 grams. The production of allyl chloride was practically identical with that of the first test.

EXAMPLE 2

The reactor used consisted of a vertical glass tube having a length of 130 cm. At the lower end the reactor had a diameter of 4 and at the upper end a diameter of 8 cm. The diameter was enlarged from 4 to 8 centimeters at a height of 100 cm. above the bottom. At either end the reactor was closed with a glass frit. The lower part of the reactor up to a height of 60 cm. above the lower glass frit was electrically heated at 200° C. The upper part of the reactor, which had a length of 70 cm., was heated at 125° C. by means of an oil heating.

The reactor was filled with 450 grams of silicon dioxide having an apparent density of 0.55 g./cc., 30 grams of powdery tellurium metal and 30 grams of powdered ammonium chloride. The three components of the catalyst had a grain diameter of 0.003 to 0.004 cm. and had been intimately mixed before introducing them into the reactor. In the state of rest, the reactor was filled with the catalyst up to a height of 70 cm. A gas mixture consisting of propylene, oxygen and hydrogen chloride was passed through at atmospheric pressure whereby the catalyst was put in a whirling motion resembling the motion of a boiling liquid.

Ascending zones of the catalyst alternated rapidly with descending zones. During operation the level of the catalyst was at 70 to 95 cm., depending on the amount of gas passed through.

When 75 liters of propylene, 30 liters of oxygen and 30 liters of hydrogen chloride were used per hour, the level of the catalyst was at 80 to 90 cm. The gas mixture leaving the reactor was cooled, whereby a condensate was obtained containing about 50 grams of allyl chloride per hour. After an operation period of 376 hours, the catalyst still contained 28.9 grams of tellurium. During the production of 19.3 kilograms of allyl chloride the loss in tellurium only amounted to 0.057 gram of tellurium per kilogram of allyl chloride.

What is claimed is:

1. In a process for preparing allyl chloride or ts monomethyl substitution products by reacting oxygen and (a) a mixture of hydrogen chloride and an olefin having 3 to 4 carbon atoms, respectively, (b) a monochloro paraffin having 3 or 4 carbon atoms, respectively, or (c) a mixture of (a) and (b) in the presence of a catalyst, said catalyst being selected from at least one member of the group consisting of tellurium and tellurium compounds and being supported on a carrier the amount of catalyst being from 0.5 to 20% by weight on basis of tellurium, the improvement which comprises causing said catalyst to flow in the reaction zone at a temperature of from 20° to 350° C. and at a pressure from 0.2 to 20 atmospheres, removing a part of said catalyst at the bottom of the reaction zone and introducing it at the top of the reaction zone.

2. The process of claim 1 and wherein the starting components and the catalyst are passed through a cooled after-reaction zone which is part of the reaction zone and in which the temperature is lower than 350° C. and higher than the dew point of the reaction products at corresponding concentration and pressure.

3. The process of claim 2, wherein the catalyst is exposed to a temperature in the after-reaction zone which is below 200° C. and above the dew point of the reaction products.

4. The process of claim 2, wherein the catalyst is exposed to a temperature in the after-reaction zone which is below 150° C. and above the dew point of the reaction products in said zone.

References Cited

UNITED STATES PATENTS 3,363,010   1/1968   Schwarzenbek _____ 260—648

FOREIGN PATENTS 642,009   5/1962   Canada.

BERNARD HELFIN, Primary Examiner

J. BOSKA, Assistant Examiner